United States Patent
Vaughn et al.

(10) Patent No.: US 6,888,103 B2
(45) Date of Patent: May 3, 2005

(54) PREFORM PREHEATER

(75) Inventors: Michael L. Vaughn, Marietta, GA (US); Khalid Mejrhirh, Atlanta, GA (US); Eddie R. Roberts, Douglasville, GA (US)

(73) Assignee: Ball Corporation, Broomfield, CO (US)

(*) Notice: Subject to any disclaimer, the term of this patent is extended or adjusted under 35 U.S.C. 154(b) by 97 days.

(21) Appl. No.: 10/158,609

(22) Filed: May 30, 2002

(65) Prior Publication Data

US 2003/0222071 A1 Dec. 4, 2003

(51) Int. Cl.[7] ............................................... F27B 9/36
(52) U.S. Cl. ...................... 219/388; 219/405; 219/411; 425/445; 425/174.4; 425/526; 264/535; 264/458; 264/520; 264/533
(58) Field of Search ............................... 219/388, 405, 219/411; 425/445, 174.4, 526; 264/535, 458, 520, 533

(56) References Cited

U.S. PATENT DOCUMENTS

| | | | |
|---|---|---|---|
| 3,079,637 A | | 3/1963 | Marzillier |
| 3,950,459 A | * | 4/1976 | Seefluth .................. 264/521 |
| 4,063,867 A | | 12/1977 | Janniére |
| 4,079,104 A | | 3/1978 | Dickson et al. |
| 4,117,050 A | * | 9/1978 | Appel et al. ............... 264/458 |
| 4,140,464 A | | 2/1979 | Spurr et al. |
| 4,147,487 A | * | 4/1979 | Dickson et al. .......... 425/174.4 |
| 4,224,263 A | | 9/1980 | Kontz |
| 4,268,975 A | * | 5/1981 | Schall et al. ............... 34/105 |
| 4,657,502 A | | 4/1987 | Rydmann |
| 4,793,960 A | | 12/1988 | Schad et al. |
| 4,850,850 A | * | 7/1989 | Takakusaki et al. ........ 425/526 |
| 4,853,171 A | | 8/1989 | Ajmera |
| 4,963,086 A | | 10/1990 | Wiatt et al. |
| 5,000,905 A | | 3/1991 | Cox et al. |
| 5,066,222 A | | 11/1991 | Roos et al. |
| 5,206,039 A | | 4/1993 | Valyi |
| 5,292,243 A | | 3/1994 | Gibbemeyer |
| 5,322,651 A | | 6/1994 | Emmer |
| 5,326,258 A | | 7/1994 | Gittner et al. |
| 5,607,706 A | | 3/1997 | Ingram |
| 5,681,521 A | | 10/1997 | Emmer et al. |
| 5,718,853 A | | 2/1998 | Ingram |
| 5,853,775 A | | 12/1998 | Oas et al. |
| 5,876,768 A | | 3/1999 | Collombin |
| 5,980,229 A | | 11/1999 | Collombin |
| 6,113,840 A | | 9/2000 | Emmer et al. |
| 6,146,134 A | | 11/2000 | Kresak et al. |
| 6,258,313 B1 | | 7/2001 | Gottlieb |
| 6,264,457 B1 | | 7/2001 | Ohmes et al. |
| 6,287,507 B1 | | 9/2001 | Appel et al. |
| 6,361,301 B1 | | 3/2002 | Scaglotti et al. |
| 6,368,099 B1 | | 4/2002 | Kresak et al. |
| 6,514,448 B1 | | 2/2003 | Vogel et al. |

FOREIGN PATENT DOCUMENTS

| | | |
|---|---|---|
| EP | 0 328 653 A1 | 8/1989 |
| EP | 0 500 028 A1 | 8/1992 |

* cited by examiner

Primary Examiner—Shawntina T. Fuqua
(74) Attorney, Agent, or Firm—Brinks Hofer Gilson Lione

(57) ABSTRACT

A housing is mounted to a slide that transports a series of preforms downward under the influence of gravity through a pre-heating apparatus toward a reheat blow molding machine. The housing is coupled to the slide so that a selected portion of each of the series of preforms is shielded from the general enviroment, and heating elements and directing elements are fixed within the housing so that heat from the heating elements is directed toward the selected portion of each series of preforms as the preforms desend down the slide to achieve a persistent thermal gradient in the preforms prior to the re-heating and blow-molding of the preform.

19 Claims, 5 Drawing Sheets

PREFORM PREHEATER

BACKGROUND OF THE INVENTION

This invention is directed to blow molding systems that employ previously formed parisons or preforms that are reheated in a reheating stage, typically from an ambient temperature to a molding temperature, prior to blow molding. More particularly, the present invention is directed to an additional preheater for such a blow molding system for preconditioning the preforms prior to the reheating stage so that a temperature differential is achieved in each preform that allows for a preferential distribution of the resin forming the preform during blow molding.

In a blow molding operation employing previously formed parisons, the temperature of each preform as it is being blown is one of the most critical process variables. Ideally, the temperature should be as consistent as possible from one preform to the next in order to achieve product uniformity of the blow molded product. The rate at which a preform can be heated from ambient temperature to a temperature suitable for blow molding is controlled in part by the thermal conductivity of the resin forming the preform. Other factors include the thickness of the material of the preform, the distance between the preform and the source of heat, the energy density or power of the heat source, and the need to not waste heat. Some prior art processes have adopted reheating profiles that are intended to achieve the desired reheating in a particularly expeditious manner such as that disclosed in U.S. Pat. No. 5,066,222.

Most reheating processes include some cooling or at least reduced heating periods to allow for equilibration of the temperature through the wall thickness of the preform. The time typically required to reheat a preform from ambient temperature to blow molding temperature far exceeds the time required to perform the blow molding and cooling steps. Thus, the time required to achieve the desired temperature characteristics for the preform, within the limits of the prior art reheating and equilibrating steps, when coupled with the physical geometry of the reheating apparatus, places a practical limit on the maximum line speed for the blow molding operation for each given apparatus. Any increases in line speed must be compensated by correspondingly lengthening the reheating apparatus so that the residence time of any preform in the reheating process is sufficient to achieve the necessary temperature profile prior to blow molding.

On occasion, it is desirable to achieve some temperature variation within each preform so that some desirable physical property can be obtained in the blow molded product. Such temperature variations have been achieved in the reheating process. Examples of the creation of temperature variations in preforms can be found in U.S. Pat. Nos. 3,775,524; 3,950,459; 4,079,104; 4,117,050; 4,423,312; 5,292,243; 5,681,521; 5,853,775 and 6,146,134. Generally, the temperature variation required to achieve any significant property difference during a blow molding process or in the product obtained from such a process is at least about 3° C. It has been recognized in U.S. Pat. No. 5,607,706 and some of the prior art discussed therein, that variations in temperature that are present in preforms prior to a reheating process can affect the final temperature of the preform and can affect the subsequent blow molding process. However, it has not previously been recognized that a purposeful introduction of temperature variations into preforms prior to a normal reheating process can be used advantageously to create desirable temperature variations affecting the blow molding process.

SUMMARY OF THE INVENTION

In accordance with the present invention, a selected portion of each preform is preheated to generate a temperature gradient between the selected portion and the remainder of the preform. The preheated preform is then introduced into a normal reheating process while the temperature gradient is still present in the preform. At the end of the reheating process, the fully reheated preform still exhibits a residual temperature gradient between the selected potion and the remainder of the preform. The fully reheated preform is then subjected to a blow molding operation while the residual temperature gradient is still present. The residual temperature gradient can be employed to improve resin flow in selected regions of the blow mold so that the final article produced by the process exhibits desirable properties that are difficult or impossible to achieve in the absence of the residual temperature gradient.

This process can be achieved by providing a preheating apparatus according to the present invention that is situated adjacent to a preform input of a reheat-blow molding machine. The apparatus includes a housing that envelops the preforms as they are carried by a conveyor into the reheat-blow molding machine input. Heating elements are provided within the housing that are directed toward a selected portion of the preforms traveling along the conveyor to define a temperature gradient in the preforms prior to their introduction into the reheating section of the reheat-blow molding machine.

In a preferred embodiment, the preheating apparatus is coupled to a gravitational slide forming an input to a reheating portion of a reheat-blow molding machine. The preheating apparatus preheats a selected portion of each preform as the preform travels down the slide. The preheating apparatus includes a housing having a first longitudinal wall fixed to a first side of the gravitational slide. A second longitudinal wall of the housing is hinged to the first longitudinal wall and is releasably coupled to a second side of the gravitational slide. Heating elements are coupled to the longitudinal walls so that the heating elements will preheat a selected portion of each preform gravitationally traveling down the slide. The heating elements are preferably in the form of infrared emitters but can include other heating emissions that will suitably interact with the resin forming the preforms. The preheating generates a defined temperature gradient in each preform prior to introduction of the preforms into the reheating section of the reheat-blow molding machine that is particularly useful in the formation of footed containers as disclosed in U.S. Pat. Nos. 5,603,423; 6,085,924; and 6,276,546.

In a preferred embodiment, a plenum is coupled to an outside surface of the first longitudinal wall over a plurality of openings between the outside surface and the inside surface of the first longitudinal wall. A fan is coupled to an opening in the plenum to exhaust air from the plenum. This causes an air flow outward through the openings in the first longitudinal wall, which in turn causes an inward flow of air downward between the performs as they travel down the slide, to ensure adequate cooling of portions of the preforms. The air flow also cools the rails of the slide, the heating elements and related hardware. Shielding elements are located adjacent to the heating elements to inhibit the heating of portions of each of the preforms that are not intended to be preheated. The shielding elements can comprise reflecting elements that reflect the infrared and other heating emission of the heating elements. Focusing elements are also coupled adjacent to the heating elements to focus the infrared and other heating emission from the heating elements toward the selected portions of the preforms intended to be preheated. End baffles can also be coupled to the ends of the longitudinal walls of the housing to help control the heat emission from the preheater.

One feature of the present invention is the capacity of the apparatus to be added to any linear entry feed of preforms into a reheat-blow molding machine so long as the region of the preform sought to be pre-heated is not shielded by the entry feed mechanism. This feature has the advantage of allowing the present invention to be adapted to a variety of reheat-blow molding machines without requiring any modification to the reheat-blow molding machine itself.

Another feature of the present invention is the capacity of the apparatus to thermally preprogram preforms to have a thermal gradient in a given region without having to modify the reheating schedule of the reheating portion of the reheat-blow molding machine. This feature has the advantage of adding a significant control feature to the process of manufacture carried out by the reheat-blow molding machine without requiring any modification to the reheat-blow molding machine itself.

Additional features and advantages will become apparent to those skilled in the art upon consideration of the following description of a preferred embodiment that is illustrated in the accompanying drawings.

DESCRIPTION OF PREFERRED EMBODIMENTS

Figure 1:
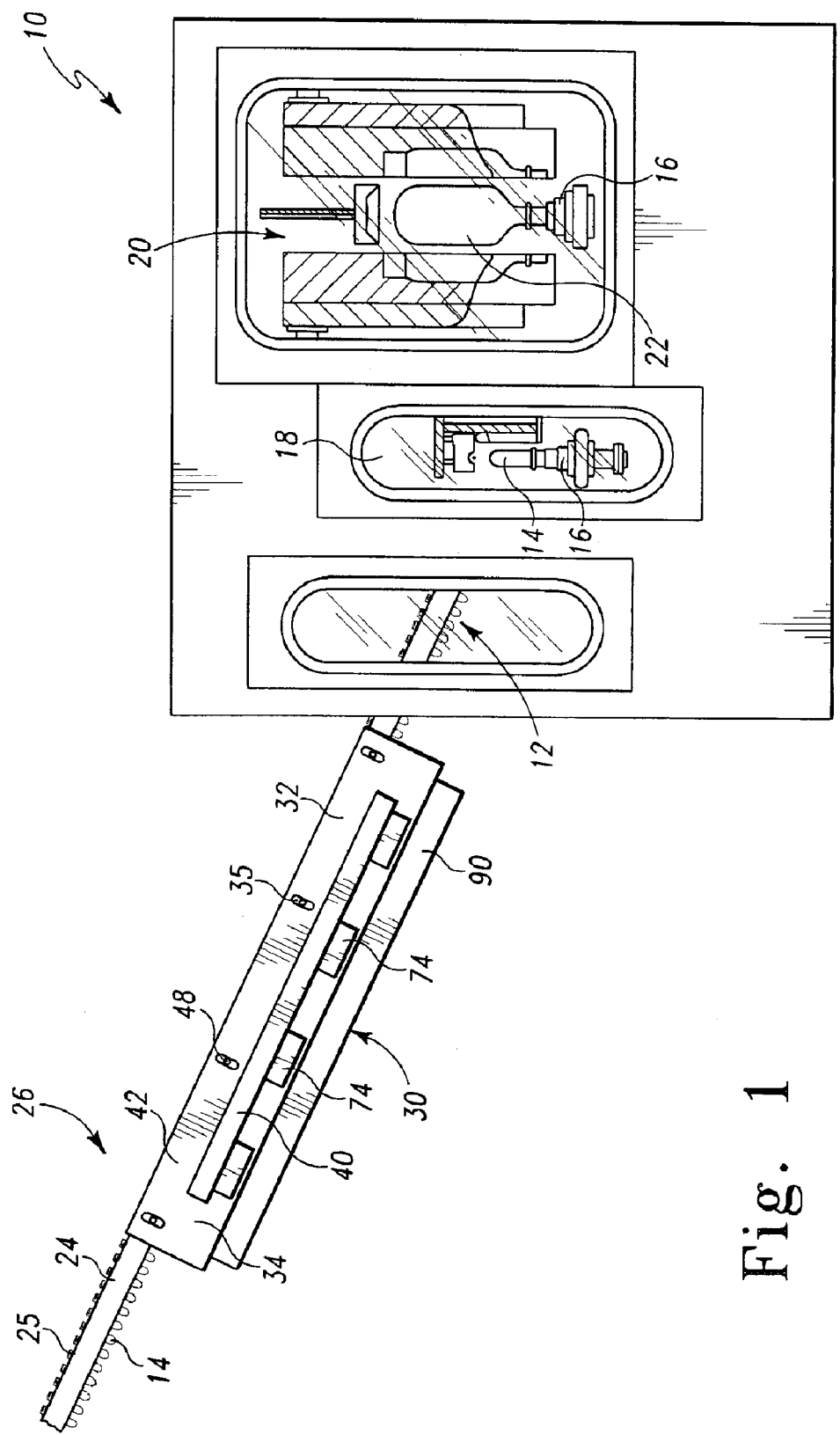
FIG. 1 is a side elevation view of a preheating apparatus of the present invention coupled to an input of a reheat-blow molding machine.
Figure 2:
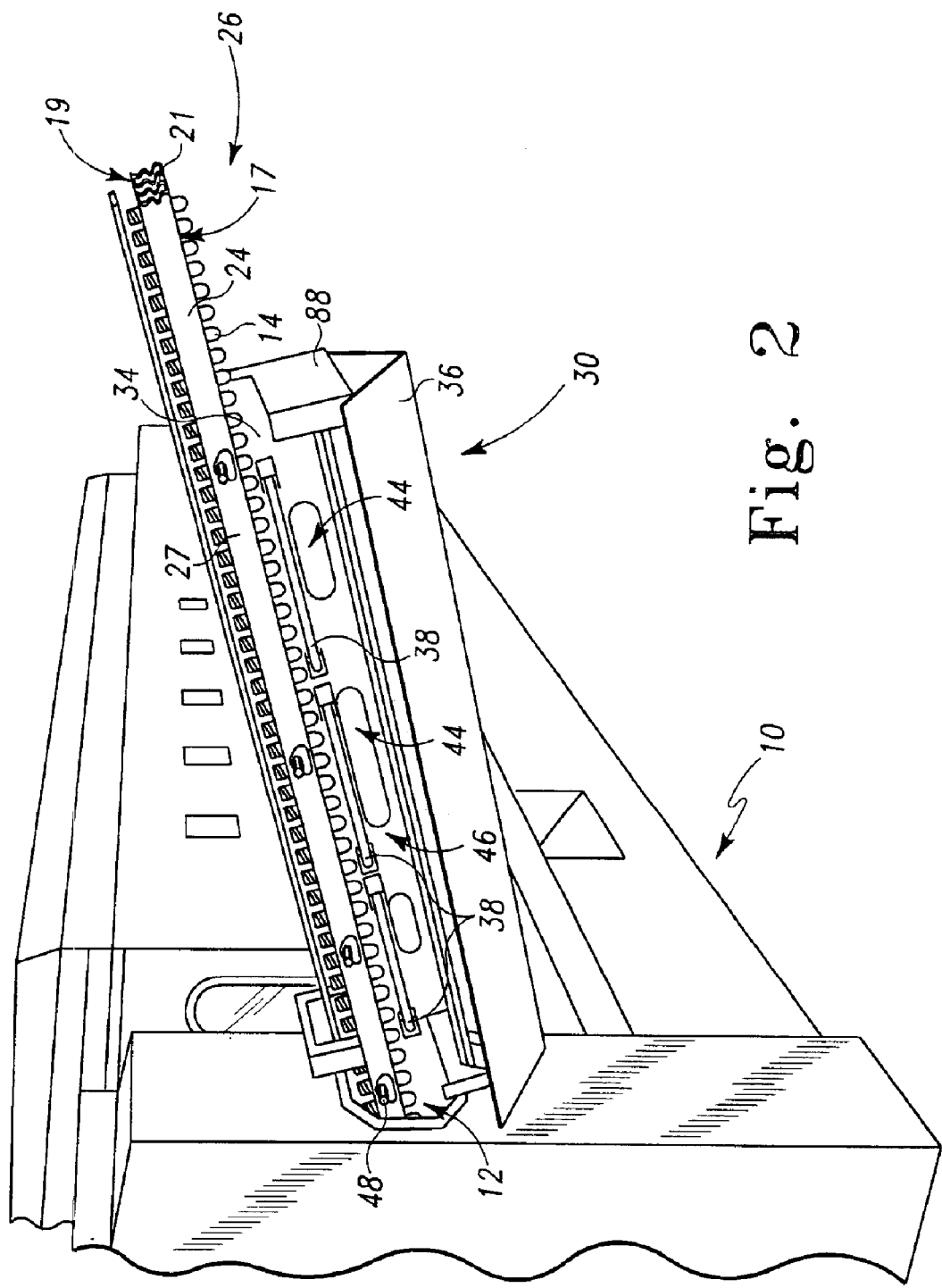
FIG. 2 is a perspective view from the opposite side of the pre-heating apparatus of FIG. 1, with the nearest sidewall lowered to allow access to the interior of the preheating apparatus.

A conventional re-heat blow molding system 10, such as a Sidel model SBO-16/24, is shown in FIGS. 1 and 2 to include a gravitation input 12 for receiving a series of previously formed parisons or preforms 14. The preforms 14 are individually loaded from the input 12 onto carriers 16, schematically shown in FIG. 1, that carry each preform 14 through a reheating stage 18 where the preforms are heated from ambient temperature to a temperature suitable for blow molding. The carriers 16 then transport each reheated preform 14 into a blow molding stage 20 where the preform is subjected to a molding operation to transform the preform 14 into another object 22 such as a bottle or other container. The molded objects 22 are then disgorged from the molding system 10 for subsequent processing and use.

Figure 5:
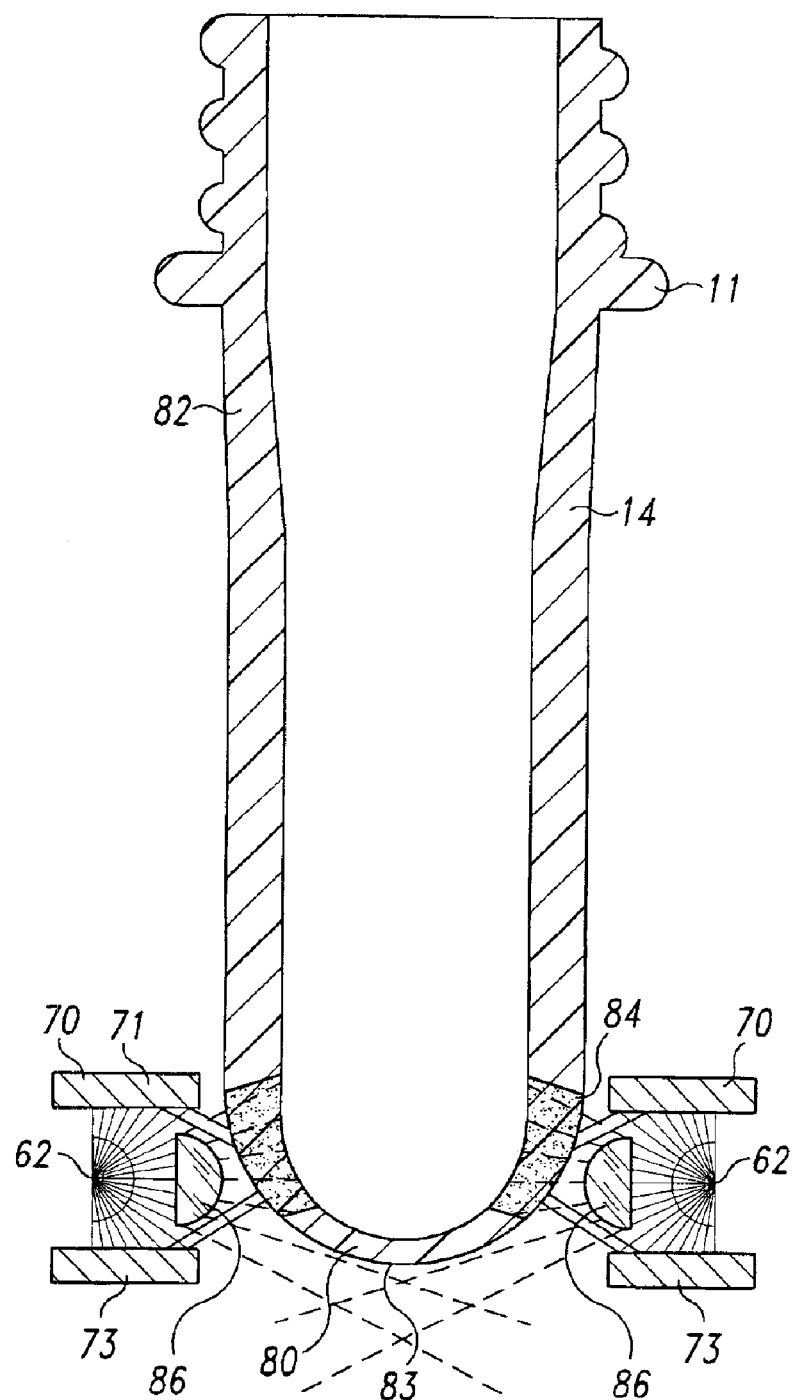
FIG. 5 is a detail schematic view of the preheating operation using a preheating apparatus of the present invention.

The preforms 14 are transported to the input 12 on a pair of spaced rails 24 that are typically inclined as shown in FIG. 1 to form a gravitational slide 26. That is, the inclination of the rails 24 is set so that the preforms 14 slide down the rails 24 into the input 12 substantially solely due to the influence of gravity. Some small amount of vibration of the rails 24 due to the normal operation of the molding system 10 can also contribute to reducing the friction between the rails 24 of the slide 26 and the preforms 14. The rails 24 are shown in greater detail in FIG. 3 to be formed of segments of square or rectangular tubing 21. Opposed, inwardly directed flanges 23 are fixed to the top surfaces 19 of the square tubing segments 21 so that they are spaced from each other by a distance greater than the diameter of the preforms 14 and less than the diameter of the preform support rings 11, shown in FIG. 5. Short bridging pieces 15 couple the ends of adjacent flanges 23 together to form one continuous surface for supporting the preforms 14 by their support rings 11.

A preheating apparatus 30 of the present invention is shown in FIGS. 1 and 2 to be coupled to the gravitational slide 26 adjacent to the input 12 to the reheating portion 18 of the reheat-blow molding machine 10. The preheating apparatus 30 can preheat any selected portion of each preform 14 as the preform travels down the slide 26, so long as the selected portion extends below the lower surfaces 17 of the tubing segments 21. As shown generally in FIGS. 1 and 2, the pre-heating apparatus 30 includes a housing 32 having a first longitudinal wall 34 fixed to a first side 25 of the gravitational slide 26. A second longitudinal wall 36 of the housing 32 is hinged to the first longitudinal wall 34 and is releasably coupled to a second side 27 of the gravitational slide 26. A plurality of heating assemblies 38 are coupled to the longitudinal walls 34 and 36 so that the heating assemblies 38 will preheat a selected portion of each preform 14 as the preform gravitationally travels down the slide 26. A plenum 40 is coupled to an outside surface 42 of the first longitudinal wall 34 over a plurality of openings 44 between the outside surface 42 and the inside surface 46.

Figure 3:
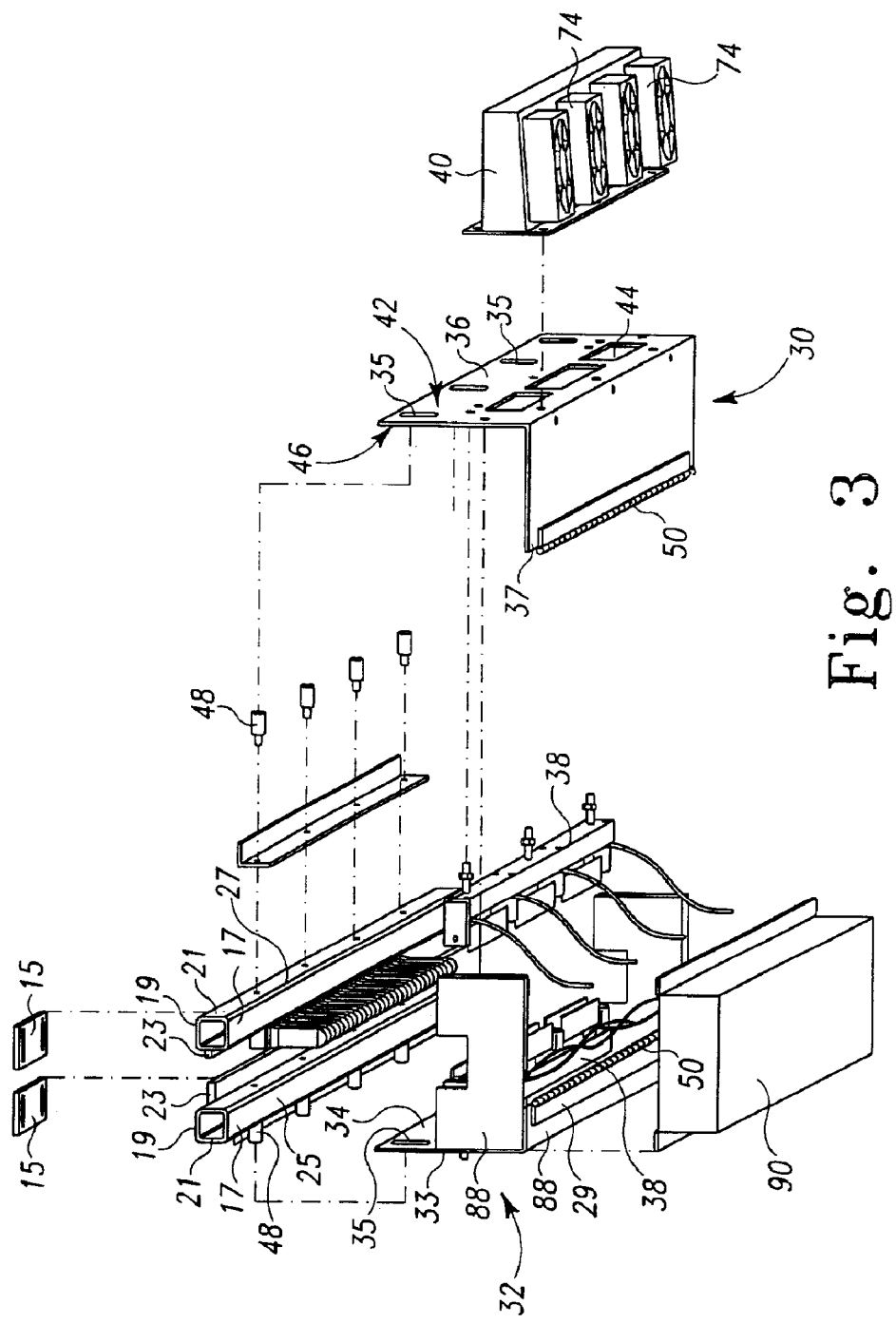
FIG. 3 is an exploded perspective view of the pre-heating apparatus of the present invention in relation to a preform input slide.

As shown in greater detail in FIG. 3, the first longitudinal wall 34 of housing 32 includes a horizontal portion 31 and a vertical portion 33. The vertical portion 33 of the first longitudinal wall 34 includes a plurality of vertical slots 35 that allow for vertical adjustment of the first wall 34. A set of fasteners 48 secures the first wall 34 to the first side 25 of the gravitational slide 26 at a desired vertical position. An inner margin 29 of the horizontal portion 31 of the first wall 34 includes a hinge 50. An inner margin 37 of the second longitudinal wall 36 of the housing 32 includes a second portion of hinge 50 and is hinged to the first longitudinal wall 34. The second wall 36 includes a similar set if vertical slots 35 that allow for vertical adjustment of housing 32 with respect to the second side 27 of the gravitational slide 26.

Figure 4:
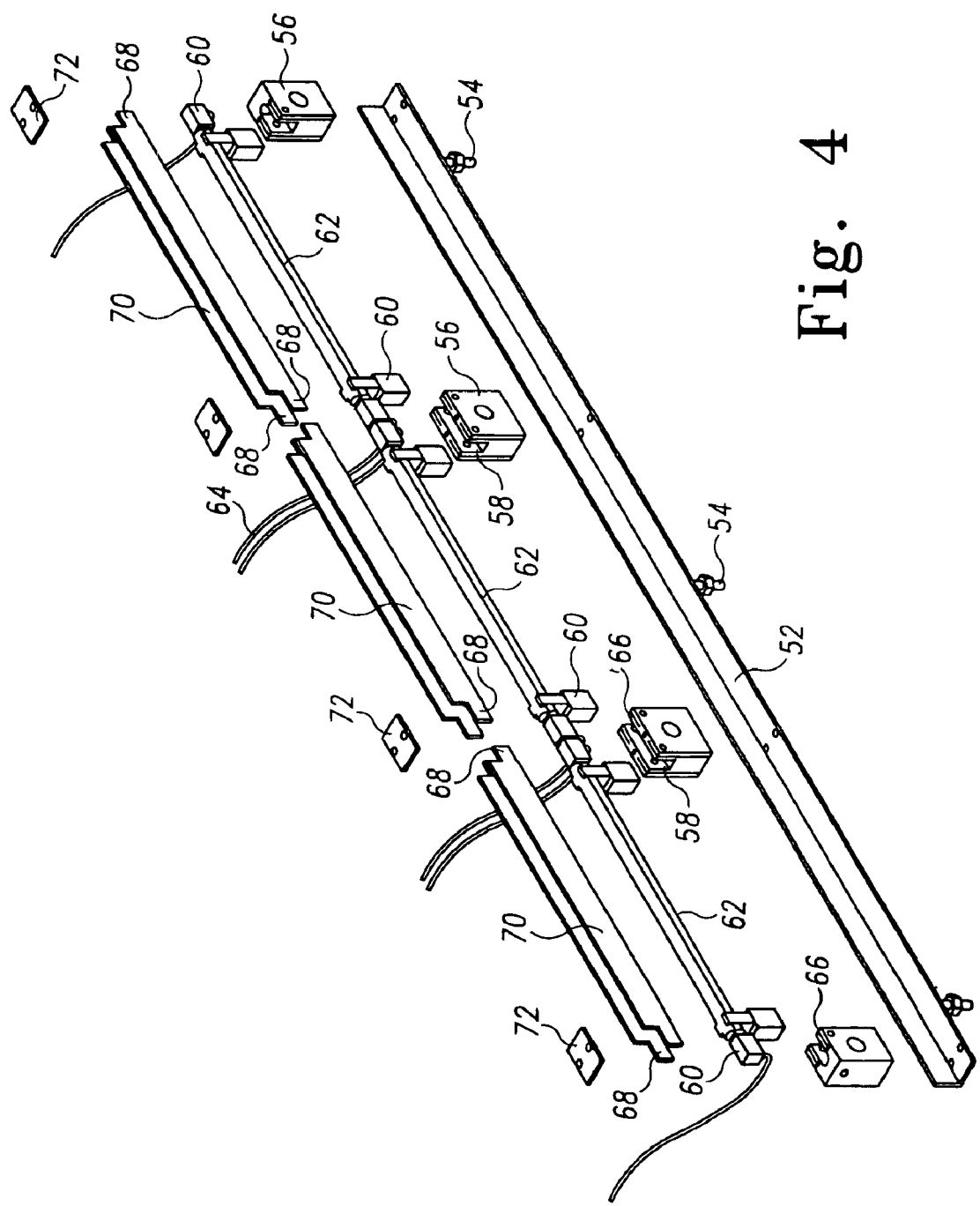
FIG. 4 is an exploded perspective view of a heater and shield assembly for a pre-heating apparatus of the present invention, and the supporting hardware therefore.

The plurality of heating assemblies 38 that are coupled to the longitudinal walls 34 and 36 are shown in greater detail in FIG. 4. Each of the heating assemblies 38 includes a base support member 52 that is coupled to one of the walls 34 or 36 by a plurality of stand-offs 54. A plurality of bases 56 are fixed to the base support member 52. Each of the bases 56 includes grooves 58 that receive electrical coupling elements 60 that are coupled to the ends of the heating elements 62 and support focusing elements 86. The coupling elements 60 are connected to wires 64 leading to a suitable source of power, such as 220 VAC, through an appropriate control unit that can be operated in conjunction with the operation of the molding machine 10. The bases 56 also include slots 66 that receive ends 68 of reflective shielding elements 70 that are located above and below the heating elements 62. Keepers 72 are employed to hold the coupling elements 60 and the shielding element ends 68 in place in the bases 56.

Returning to FIG. 3, the heating assemblies 38 are fixed to both of the longitudinal walls 34 and 36 at a fixed location. Any vertical adjustment in position of the heating assemblies 38 with respect to the preforms 14 is achieved by adjusting the vertical position of the walls 34 and 36 with respect to the slide 26 so that the heating assemblies 38 will preheat a selected portion of each preform 14 as the preform gravitationally travels down the slide 26. One preferred position for the heating assemblies is illustrated schematically in FIG. 5. The preform 14 is seen to include a generally hemispherical bottom portion 80 that is unitarily formed at the lower end of a right cylindrical sidewall portion 82. A transition or heel area 84, which has the form of a curved ring located between the sidewall portion 82 and the gate area 83, is of principal interest as this heel area 84 is employed to form the foot portions of a footed container. The present invention can be of significant benefit to improve the plastic flow of resin in this area of the preform during the blow-molding of such footed containers. The shielding elements 70 are located adjacent to the heating elements 62 to inhibit the heating of unwanted portions of the performs 14. In particular the upper shielding elements 71 shield the sidewall portion 82 of each of the preforms 14 so that a temperature gradient of at least about 3° C., and more preferably about 17° C. is developed, between the heel portion 84 and the sidewall portion 82 of each preform 14, the gradient being measured at the end of the preheating apparatus 30 adjacent to the input 12 to the reheating portion 18 of the reheat-blow molding machine 10. The shielding elements 70 can comprise reflecting elements that reflect infrared emissions of the heating elements 62. Focusing elements 86 are also coupled adjacent to the heating elements 62 to focus infrared emissions from the heating elements 62 toward the selected portions of the preforms 14. In the illustrated embodiment, the lower shielding elements 73 act to shield the gate area 83 of the preform 14 so that a temperature gradient of at least about 3° C., and more typically about 6° C., is developed between the heel portion 84 and the gate area 83 of each preform 14, the gradient again being measured at the end of the preheating apparatus 30 adjacent to the input 12 to the reheat-blow molding machine 10.

Returning again to FIG. 3, the plenum 40 is coupled to the outside surface 42 of the first longitudinal wall 34 over a plurality of openings 44 that permit an outward flow of air into the plenum 40 from the preheating apparatus 30. The flow of air is achieved by a plurality of fans 74 that are coupled to exhaust openings on a lower surface 76 of the plenum 40. To achieve the desired cooling of the non-preheated portions of the performs 14, the slide 26, and the equipment forming the preheating apparatus 30, the fans 74 are preferably powered continuously. It will be appreciated that some temperature control can be achieved by varying the number of fans 74 operating or varying the speed of operation of the fans 74. A bottom cover 90 is provided that contains the power connections for the wires 64. End baffles 88 can also be coupled to the ends of the longitudinal walls 34 and/or 36 of the housing 32 to help control the heat emission from the preheating apparatus 30 and the air flow patterns caused by the fans 74. The outward flow of air through the openings 44 in the first longitudinal wall 34 inhibits overheating of those portions of the preforms 14 being directly heated by the heating elements 38.

In operation, the preheating apparatus 30 provides a thermal bias in the form of a temperature gradient between a first selected portion of each preform 14, such as the heel portion 84, and a second selected portion of each preform 14, such as the sidewall portion 82. This thermal bias or thermal gradient persists at least to some extent during the reheating stage 18 so that when the preforms 14 enter the blow molding stage 20, the selected portion 84 remains at a temperature that permits an enhanced plastic flow so that the article formed by the molding process, such as a bottle or container, can be formed more quickly and with higher quality characteristics that are possible in the absence of the preheating apparatus 30.

It is to be understood that the invention is not limited to the illustrations described and shown herein, which are deemed to be merely illustrative of the best modes of carrying out the invention, and which are susceptible to modification of form, size, arrangement of parts and details of operation.

What is claimed is:

1. Pre-heating apparatus for coupling to an input apparatus connected to a reheating portion of a reheat-blow molding machine to preheat a selected portion of preforms traveling through the input apparatus, the pre-heating apparatus comprising:
    a housing having a first longitudinal wall fixed to a first side of the input apparatus, and a second longitudinal wall hinged to the first longitudinal wall and releasably coupled to a second side of the input apparatus,
    heating elements coupled to the longitudinal walls for preheating a selected portion of preforms, gravitationally traveling through the input apparatus, to a defined temperature gradient prior to introduction of the preforms into the reheating section of the reheat-blow molding machine, and
    shielding elements located adjacent to the heating elements for inhibiting the heating of chosen portions of each of the preforms.

2. The pre-heating apparatus of claim 1 further comprising a plenum coupled to an outside surface of the first longitudinal wall, the longitudinal wall having a plurality of openings between the outside surface and an inside surface of the first longitudinal wall.

3. The pre-heating apparatus of claim 2 further comprising a fan coupled to an exhaust opening in the plenum for withdrawing air from the plenum and through the openings in the first longitudinal wall.

4. The pre-heating apparatus of claim 1 wherein the shielding elements comprise reflecting elements for reflecting infrared emissions of the heating elements.

5. The pre-heating apparatus of any of claims 1–3 or 4 further comprising focusing elements coupled adjacent to the heating elements for focusing infrared emissions from the heating elements toward the selected portions of the preforms.

6. The pre-heating apparatus of claim 5 further comprising end baffles coupled to the ends of the longitudinal walls of the housing.

7. In a reheat-blow molding machine including a reheating section and an input apparatus coupled to the reheating section for introducing a series of preforms to be blow-molded, the improvement comprising pre-heating apparatus coupled to the input apparatus for preheating a selected portion of each preform as the preform moves through the input apparatus, the pre-heating apparatus comprising
    a housing coupled to the input apparatus, and
    heating elements situated within the housing and directed toward a selected locus of points situated in relation to the input apparatus to define a path along which the selected portion of each preform travels as the preform moves through the input apparatus.

8. The pre-heating apparatus of claim 7 further comprising focusing elements coupled adjacent to the heating elements for focusing infrared emissions from the heating elements toward said selected locus of points.

9. The pre-heating apparatus of either of claims 7 or 8 further comprising shielding elements located adjacent to the heating elements for inhibiting the heating of chosen locations vertically remote from said selected locus of points.

10. The pre-heating apparatus of claim 9 wherein the shielding elements comprise reflecting elements for reflecting infrared emissions of the heating elements.

11. The pre-heating apparatus of either of claims 7 or 8 further comprising a plenum coupled to an outside surface of the housing, the housing having a plurality of openings connecting the plenum to an interior portion of the housing.

12. The pre-heating apparatus of claim 11 further comprising a fan coupled to an exhaust opening in the plenum for withdrawing air from the plenum and the housing through the openings in the housing.

13. The pre-heating apparatus of claim 11 wherein said housing comprises a first longitudinal wall fixed to a first side of the input apparatus, and a second longitudinal wall hinged to the first longitudinal wall and releasably coupled to a second side of the input apparatus.

14. The pre-heating apparatus of claim 13 wherein said plenum is coupled to an outside surface of said first longitudinal wall.

15. The pre-heating apparatus of claim 13 further comprising end baffles coupled to the ends of the longitudinal walls of the housing.

16. Pre-heating apparatus for pre-heating a selected portion of each of a series of preforms prior to re-heating and blow-molding the preform, the pre-heating apparatus comprising:

a gravitational slide for transporting the series of preforms downward under the influence of gravity, a housing coupled to the slide so that the selected portion of each of the series of preforms is shielded from the general environment, heating elements fixed within the housing so that heat from the heating elements is directed toward the selected portion of each of the series of preforms as the preforms descend down the gravitational slide, lens elements coupled adjacent to the heating elements for focusing infrared emissions from the heating elements toward said selected portions of each of the series of preforms, and reflective shielding elements located adjacent to the heating elements for inhibiting the heating of other than the selected portions of the preforms to achieve a defined temperature gradient in each of the preforms prior to introduction of the preforms into a reheating section of an adjacent reheat-blow molding machine.

17. The pre-heating apparatus of claim 16 wherein the gravitational slide comprises a pair of longitudinal tubing members disposed in uniformly spaced relation from each other, an inwardly extending flange coupled to an upper surface of each of the longitudinal tubing members, each of the flanges having an inside edge spaced uniformly from the adjacent flange to define a channel for receiving said series of preforms, the preforms be suspended by the adjacent inside edges of the flanges.

18. The pre-heating apparatus of claim 17 wherein said housing comprises a first longitudinal wall fixed to a first side of the gravitational slide, a second longitudinal wall hinged to the first longitudinal wall and releasably coupled to a second side of the gravitational slide, a plenum coupled to an outside surface of the first longitudinal wall, the longitudinal wall having a plurality of openings between the outside surface and an inside surface of the first longitudinal wall, a fan coupled to an exhaust opening in the plenum for withdrawing air from the plenum and housing through the openings in the first longitudinal wall, and end baffles coupled to the ends of the longitudinal walls of the housing, the end baffles including a slot permitting lower ends of the preforms to pass into and out of the pre-heating apparatus.

19. A method for increasing the rate of production of blow-molded articles in a reheat-blow process, the process comprising the steps of reheating preforms to a blow-molding temperature and blowing the reheated preforms within a mold until the preform conforms to the mold interior configuration, the method comprising the steps of:

preheating a selected portion of each preform prior to the reheating step to generate a temperature gradient between the selected portion and the remainder of the preform, and initiating said reheating step while the temperature gradient is still present in the preform.

\* \* \* \* \*